United States Patent [19]

Ziermann

[11] Patent Number: 5,237,606
[45] Date of Patent: Aug. 17, 1993

[54] ENHANCED SYNCHRONOUS RECTIFIER

[75] Inventor: Mark S. Ziermann, Bolingbrook, Ill.

[73] Assignee: Charles Industries, Ltd., Rolling Meadows, Ill.

[21] Appl. No.: 694,124

[22] Filed: May 1, 1991

[51] Int. Cl.[5] .................... H04M 1/00; H02M 3/335
[52] U.S. Cl. ................... 379/413; 379/412; 363/21
[58] Field of Search ............... 379/413, 412, 186, 187, 379/322, 323, 324; 363/21, 127

[56] References Cited

U.S. PATENT DOCUMENTS

| | | | |
|---|---|---|---|
| 4,709,315 | 11/1987 | Ramos | 363/21 |
| 4,813,066 | 3/1989 | Holtz et al. | 379/413 |
| 4,866,587 | 9/1989 | Wadlington | 363/21 |
| 4,870,555 | 9/1989 | White | 363/21 |
| 4,922,404 | 5/1990 | Ludwig et al. | 363/127 |
| 4,996,638 | 2/1991 | Orr | 363/21 |
| 5,034,871 | 7/1991 | Okamoto et al. | 363/21 |
| 5,068,575 | 11/1991 | Dunsmore et al. | 363/21 |

OTHER PUBLICATIONS

Wally E. Rippel, "Synchronous Half-Wave Rectifier," NASA Tech Briefs, p. 24, (Jul. 1989).
"Using Bipolar Synchronous Rectifiers Improves Power Supply Efficiency," Unitrode Corporation Application Note U-103, pp. 12-88-12-94, (Jun. 1985).
William R. Archer, "Current-Driver Synchronous Rectifier," Motorola TMOS Power FET Design Ideas, BR 316, pp. 9-10, (1985).
"Synchronous Rectification," Siliconix Design Ideas, No. 2, p. 2, (Oct. 1980).
John Markus, "Guidebook of Electronic Circuits," Motorola, AN-517, pp. 647, 649 (1971).

*Primary Examiner*—James L. Dwyer
*Assistant Examiner*—Jack Chiang
*Attorney, Agent, or Firm*—Leydig, Voit & Mayer

[57] ABSTRACT

A power converter is provided located in a remote terminal of a telephone system, the telephone system having a central office which powers a plurality of telephone loops with a DC voltage having at least two substantially different levels. The remote terminal power converter derives remote terminal output load voltages including a low voltage regulated supply from the DC voltage provided to the loop from the central office. The remote terminal power converter comprises a synchronous rectifier for providing a predetermined low voltage regulated supply. The remote terminal power converter further comprises a receiving circuit connected to the loop for receiving DC voltage from the central office and supplying a low voltage output for producing the low voltage regulated supply. A switch is associated with the receiving circuit for producing an output signal on the low voltage output, the output signal having sequential charging, flyback, and discontinuous intervals. The discontinuous interval has a variable time duration dependent on at least the voltage level being coupled to the loop by the central office. The synchronous rectifier is coupled between the low voltage output and the low voltage regulated supply and includes a power switching device, and a circuit responsive to the termination of the charging interval for driving the power switching device on. The synchronous rectifier also includes a circuit for sensing a condition indicative of the onset of the discontinuous interval and turning off the power switching device for at least the duration of the discontinuous interval, independent of the time duration of the discontinuous interval.

40 Claims, 3 Drawing Sheets

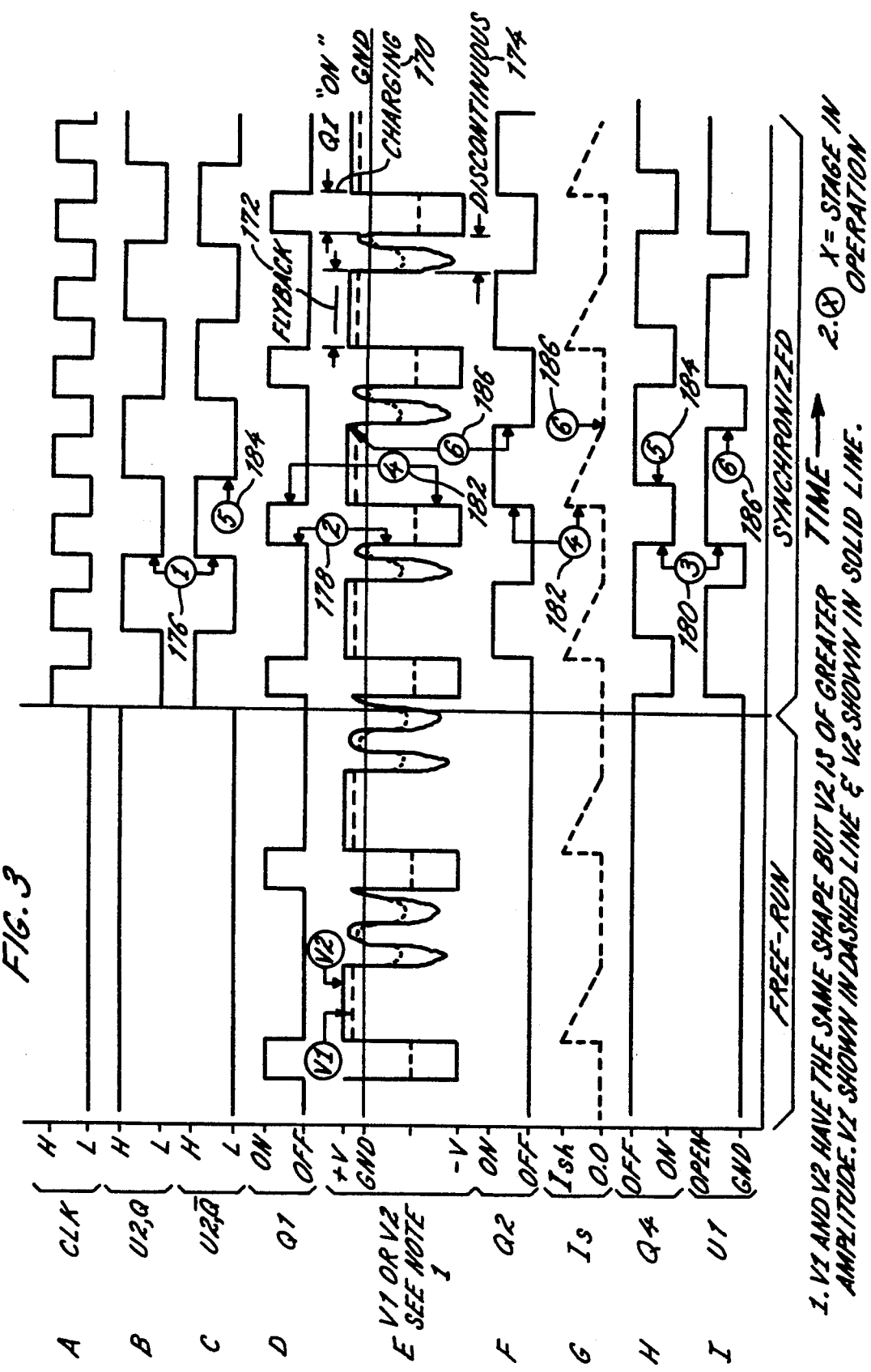

ENHANCED SYNCHRONOUS RECTIFIER

FIELD OF THE INVENTION

The present invention relates to power converters, and more particularly, to a power converter which has the capability to operate in a remote terminal connected to a subscriber loop in a telephone system which is powered from DC voltages applied to the loop at the central office.

BACKGROUND OF THE INVENTION

In conventional telephone systems, the telephones are powered from a central office of the particular telephone company, with a voltage being supplied to each telephone over a pair of telephone wires. The telephone lines in this type of service are often referred to as "plain old telephone service" (hereinafter POTS) quality lines. The central office normally supplies −48 V in an idle condition, typically referred to as "talk battery," when a ringing signal is not present. When an incoming call is initiated, the central office superimposes an AC ringing signal upon the normal DC voltage to generate a signaling or ringing noise on the customer telephone.

In these conventional telephone systems, it typically has been required to provide power to the customer telephones from the central office rather than locally, so that in the event of a local electrical power failure, the customer telephones remain operational. For a variety of reasons, however, it is desirable to provide power to customer telephones and generate ringing signals at a remote terminal located closer to customer premises. For example, the ability to power digital multiplexing equipment at a remote terminal close to the customer enables the telephone company to provide service to several customer devices. However, due to the high loop impedances associated with POTS lines, a central office would have to provide a high level of voltage in order to power remote digital equipment, supply talk battery, and power a remote terminal ringing generator.

Systems have been proposed for digitally multiplexing existing telephone systems having POTS quality lines in order to provide two complete telephone signals over a single pair of POTS lines, such as the development of 2B1Q technology. These digitally multiplexed telephone systems increase the utility of existing POTS lines, which previously served only a single customer device, to serve multiple customer devices having distinct telephone numbers using the existing single pair of POTS wires. However, in digitally multiplexed telephone systems, it is necessary to provide a regulated low voltage supply to the digital components located in a remote terminal. Thus, the use of digital multiplexing for telecommunications systems further necessitates the development of a highly reliable remote terminal power converter.

In digital multiplexing systems utilizing remote terminals, the central office must supply a voltage output capable of powering a remote terminal ringing generator, in addition to providing a talk battery supply voltage. For example, depending on changes in power demands at the remote terminal, and when considering the high loop impedance of POTS quality lines, the central office must provide voltage levels from about −78 V to as high 260 V (+130 V to −130 V). Thus, a successful and reliable remote terminal power converter must be capable of receiving and converting widely variable DC input voltages from the central office in order to provide a regulated output voltage to the multiple customer devices, a function which significantly complicates the design of remote power converters in telephone systems. Additionally, a successful remote terminal power converter must be capable of delivering a regulated low voltage supply (typically +5 V) to the logic circuits of the digital multiplexing components from the widely variable DC input voltages provided by the central office.

In order to provide the required output voltage to the particular loads, it is necessary to use some type of rectifier in the remote terminal power converter. Typically, a diode would be utilized. However, conventional diodes have a voltage drop when they conduct current that dissipates heat, depending on the RMS value of the current pulses through the diodes. The amount that the voltage drop of the rectifier diodes detracts from the overall efficiency of the converter is dependent mainly upon the level of the output voltage. For example, if the output voltage is relatively high, such as 48 V, then the diode voltage drop is insignificant. However, if the required output voltage is low, such as +5 V for digital logic circuits, then the diode voltage drop becomes a significant factor in the inefficiency of the converter.

In power rectifier applications, conventional silicon diodes have a voltage drop of about 0.8 V, while Schottky diodes have a voltage drop of about 0.6 V. Additionally, conventional diodes have a relatively high reverse voltage breakdown, while Schottky diodes have a relatively limited reverse breakdown voltage, a maximum of 60 V. As is apparent, both of these types of diodes would significantly decrease the efficiency of a DC—DC converter which is used to deliver a regulated low voltage output. Thus, it is desirable to replace the conventional diode with some other type of rectifier in order to maximize the converter efficiency by minimizing the rectifier voltage drop. One possibility is the use of a synchronous rectifier, which could utilize any number of power switching elements to perform the rectifier function, such as a power transistor or a power field effect transistor (FET).

Synchronous rectifiers are typically used with transformers which couple large amounts of power to output loads. In this environment, a significant advantage with the use of synchronous rectifiers is that they produce far less heat dissipation associated with high power coupling. In order to operate properly, however, the synchronous rectifier must operate in a continuous mode. In other words, energy must always be either flowing into or out of the core of the transformer.

In a situation as described above in which it is desired to provide a low voltage regulated supply from a widely variable DC input voltage, the use of a synchronous rectifier in a remote terminal power convertor becomes greatly complicated. Because of the wide variations in the input voltages from the central office and the output load demands, a discontinuous interval arises. This discontinuous interval occurs when energy is neither flowing into or out of the core of the transformer, thus allowing the transformer to oscillate at its self-resonant frequency. The discontinuous interval has a variable time duration dependent on the input voltage level being coupled to the remote terminal power converter from the central office, and the power demanded from the output loads. Thus, in order to provide a suitable low voltage output to the low voltage loads, it is necessary to prevent the discontinuous interval from affecting the output voltage regardless of the duration of the discontinuous interval, a function which significantly complicates the design and use of a synchronous rectifier in a power converter.

SUMMARY OF THE INVENTION

In view of the foregoing, it is a general aim of the present invention to provide a power converter capable of accepting widely varying input voltages and efficiently delivering a predetermined low voltage regulated output.

In accomplishing that aim, it is an object of the present invention to provide a power converter including an enhanced synchronous rectifier capable of operating properly and efficiently with a discontinuous flyback converter design.

It is another object of the present invention to increase the efficiency of a remote terminal power converter in a telephone system by reducing the loss associated with conventional diode rectifiers.

It is a related object of the present invention to provide a discontinuous flyback converter design for a remote terminal power converter in a telephone system having increased efficiency.

It is another object of the present invention to provide a remote terminal power converter in a telephone system including an enhanced synchronous rectifier capable of operating properly and efficiently with a discontinuous flyback converter.

It is feature of the power converter of the present invention that an enhanced synchronous rectifier is used to increase the efficiency of a discontinuous flyback converter by reducing the voltage drop associated with diode rectifiers.

It is another feature of the power converter of the present invention that the enhanced synchronous rectifier can be activated at the termination of the charging interval so that it conducts only during the flyback interval.

It is yet another feature of the power converter of the present invention that the enhanced synchronous rectifier is capable of being "turned off" for the entire discontinuous interval independent of the duration of the discontinuous interval so that only a regulated low voltage output is delivered.

It is a related feature of the present invention that the enhanced synchronous rectifier can sense a condition indicative of the onset of the discontinuous interval and turn off the synchronous rectifier during the entire discontinuous interval.

It is still another feature of the present invention that the synchronous rectifier can be reactivated after the termination of the discontinuous interval.

In accordance with the present invention, in its preferred application, a power converter is provided located in a remote terminal of a telephone system, the telephone system having a central office which powers a plurality of telephone loops with a DC voltage variable between at least two substantially different levels. The remote terminal power converter derives remote terminal output voltages including a low voltage regulated supply from the DC voltage provided to the loop from the central office. The remote terminal power converter comprises a synchronous rectifier for providing a predetermined low voltage regulated supply. The synchronous rectifier increases the efficiency of the remote terminal power converter by reducing the loss associated with conventional diode rectifiers. The remote terminal power converter further comprises means connected to the loop for receiving DC voltage from the central office and supplying a low voltage output for producing the low voltage regulated supply. A switch means is associated with the receiving means for producing an output signal on the low voltage output, the output signal having sequential charging, flyback, and discontinuous intervals. The discontinuous interval has a variable time duration dependent on at least the voltage level being coupled to the loop by the central office. The synchronous rectifier is coupled between the low voltage output and the low voltage regulated supply and includes a power switching device, and means responsive to the termination of the charging interval for driving the power switching device on. The synchronous rectifier also includes means for sensing a condition indicative of the onset of the discontinuous interval and turning off the power switching device for at least the duration of the discontinuous interval, independent of the time duration of the discontinuous interval.

In its broadest aspects, the power converter of the present invention is capable of deriving output load voltages including a low voltage regulated supply from a DC input voltage variable between at least two substantially different levels. The power converter comprises means for receiving the DC input voltage and supplying a low voltage output for producing the low voltage regulated supply. The power converter also includes switch means associated with the receiving means for producing an output signal on the low voltage output. The switch means controls the time periods of a charging interval and a flyback interval of the output signal. The output signal also has a discontinuous interval having a variable time duration occurring between the termination of the flyback interval and the initiation of the charging interval. The power converter further comprises a synchronous rectifier coupled between the low voltage output and the low voltage regulated supply. The synchronous rectifier includes a power switching device, and means responsive to the termination of the charging interval for driving the power switching device on. The synchronous rectifier also includes means for sensing a condition indicative of the onset of the discontinuous interval and turning off the power switching device for at least the duration of the discontinuous interval, independent of the time duration of the discontinuous interval.

BRIEF DESCRIPTION OF THE DRAWINGS

FIG. 3 is a set of waveforms used to demonstrate the operation, of the enhanced synchronous rectifier of the remote terminal power converter of the present invention.

DETAILED DESCRIPTION OF THE PREFERRED EMBODIMENTS

While the invention will be described in connection with a preferred embodiment, there is no intent to limit the invention to this embodiment. On the contrary, the intent is to cover all alternatives, modifications, and equivalents included within the spirit and scope of the invention as defined in the appended claims.

In its broadest aspects, the present invention provides a power converter including an enhanced synchronous rectifier capable of deriving at least a predetermined low voltage regulated supply from a DC input voltage variable between at least two substantially different levels. As stated above, synchronous rectifiers are typically used in transformers which provide high power coupling, and must operate only in a continuous mode. However, the power converter of the present invention uses a discontinuous flyback converter design including an enhanced synchronous rectifier which is capable of operating in both a continuous and a discontinuous mode in order to provide the predetermined low voltage regulated supply. In its preferred application, the power converter of the present invention is used in a telephone system which includes a remote terminal power converter for supplying power to multiple customer devices and digital multiplexing equipment. However, the power converter of the present invention can be used in various applications, and is not limited only to applications involving remote terminal power converters in telephone systems. With that in mind, because the power converter of the present invention has its preferred application in telephone systems, it will be described below in a telephone system in connection with the drawings.

Figure 1:
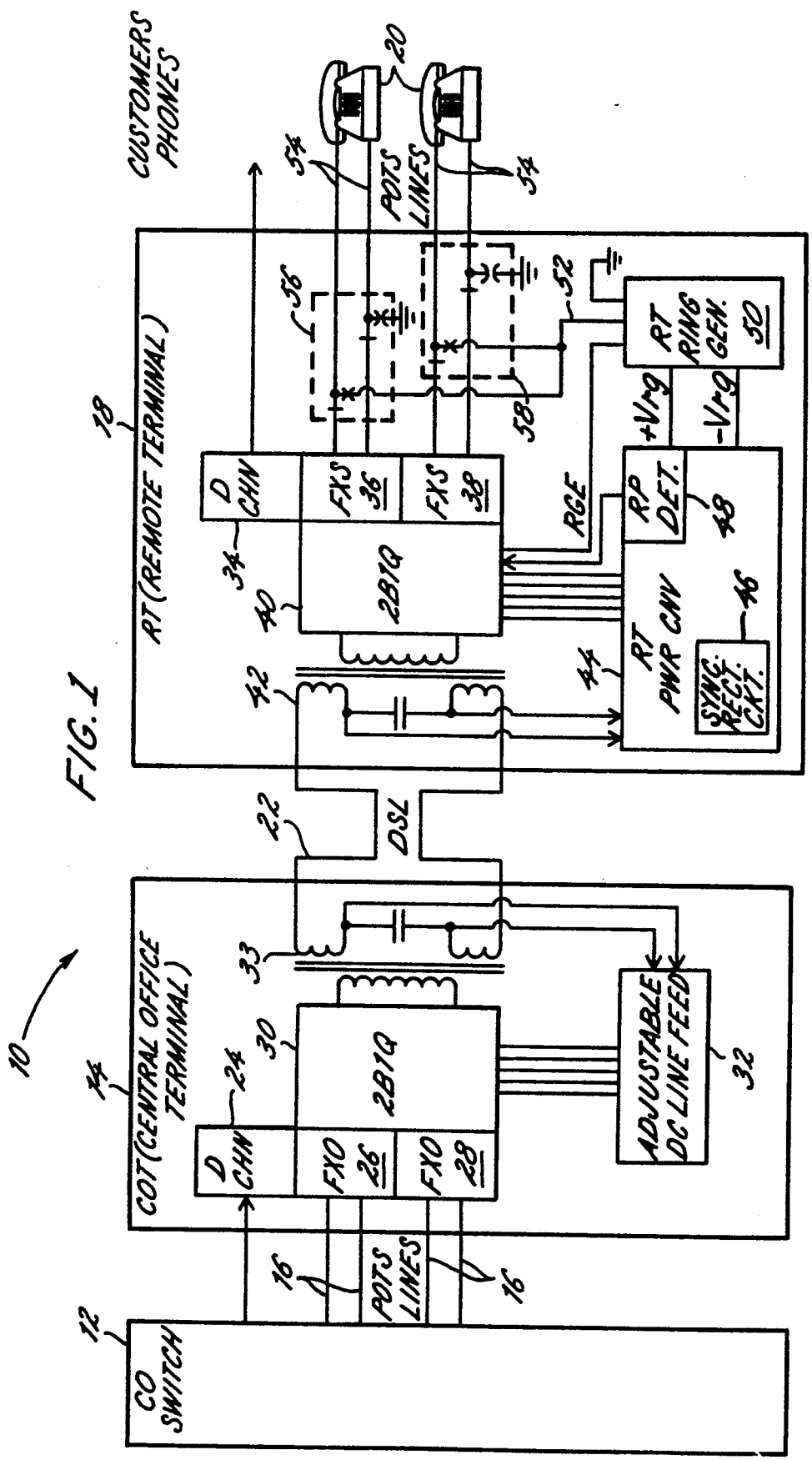
FIG. 1 is a block diagram of a digitally multiplexed telephone system including the remote terminal power converter of the present invention.

Turning now to the drawings, FIG. 1 is a block diagram illustrating a telephone system 10. In accordance with the present invention, the remote terminal power converter of the present invention, shown as remote terminal power convertor 44, is capable of receiving widely variable DC voltage provided by a central office terminal 14, and efficiently deriving remote terminal output voltages, including a predetermined low voltage regulated supply which powers remote terminal digital multiplexing components included in the telephone system 10. The central office terminal 14 is connected to a telephone loop through POTS quality lines 22 also denoted as DSL, and powers the loop with a DC voltage variable between at least two levels, one level for an idle condition and another level for busy or ringing conditions. Thus, the remote terminal power converter 44 of the present invention comprises one part of the telephone system 10 described in greater detail below.

In FIG. 1, a central office switch 12 is connected to the central office terminal 14 by POTS lines 16. The central office terminal 14 provides power to a remote terminal 18, which in turn provides a regulated DC voltage supply to customer devices, shown in FIG. 1 as customer telephones 20. As stated above, the remote terminal power converter 44 of the present invention located in remote terminal 18, also supplies a predetermined low voltage regulated supply.

The telephone system 10 uses digital multiplexing in order to provide more than one complete telephone signal over a single pair of POTS quality telephone lines. The central office terminal 14 superimposes digital overhead signals upon a DC supply voltage to the remote terminal 18 through the pair of POTS quality lines 22. It should be noted that in most instances POTS lines 22 are long, and thus have high loop impedances. In order for telephone system 10 to interface a plurality of customer devices, each having a distinct telephone number, on a single pair of POTS lines 22, the central office terminal 14 includes digital multiplexing equipment including a D channel circuit 24, two foreign exchange office (FXO) circuits 26 and 28, and a 2B1Q device 30. The 2B1Q circuit 30 consolidates and encodes multiple incoming signals from the central office switch 12 into multiplexed digital signals for transmission over POTS lines 22 to the remote terminal 18. The central office terminal 14 also includes an adjustable DC line feed 32 and a transformer 33.

In order to complete the interface of multiple customer devices on a single pair of POTS lines, the remote terminal 18 includes digital equipment for demultiplexing the digital signals transmitted across POTS lines 22 from the central office terminal 14. The remote terminal digital equipment comprises a D channel 34, two foreign exchange subscriber (FXS) circuits 36 and 38, and a 2B1Q circuit 40. The remote terminal 18 includes an interface transformer 42 for receiving the output signals sent across POTS lines 22 from the central office terminal 14.

In accordance with the present invention, the remote terminal power converter 44 receives the incoming voltage from the central office and converts it into a regulated DC voltage including a predetermined regulated low output voltage. This regulated low output voltage powers the logic circuits of the digital multiplexing equipment located in the remote terminal. In the preferred embodiment, the remote terminal power converter 44 comprises a discontinuous flyback converter, as explained in greater detail below. Within remote terminal power converter 44 is an enhanced synchronous rectifier circuit 46 which provides the predetermined low voltage regulated supply. The enhanced synchronous rectifier circuit 46 increases the efficiency of the remote terminal power converter 44 by reducing the loss associated with diode rectifiers.

The power converter 44 also includes a reserve power detector 48 which checks the reserve power of the power converter 44 and supplies a signal to 2B1Q circuit 40 when the reserve power becomes less than a predetermined amount. The 2B1Q circuit 40 detects the reserve power signal and returns a digital signal superimposed upon the DC supply voltage over POTS lines 22 to the 2B1Q circuit 30, which detects the incoming request for additional voltage. The 2B1Q circuit 30 then supplies a signal to adjustable DC line feed 32 which in turn increases the power output supply to the remote terminal 18.

Figure 2:
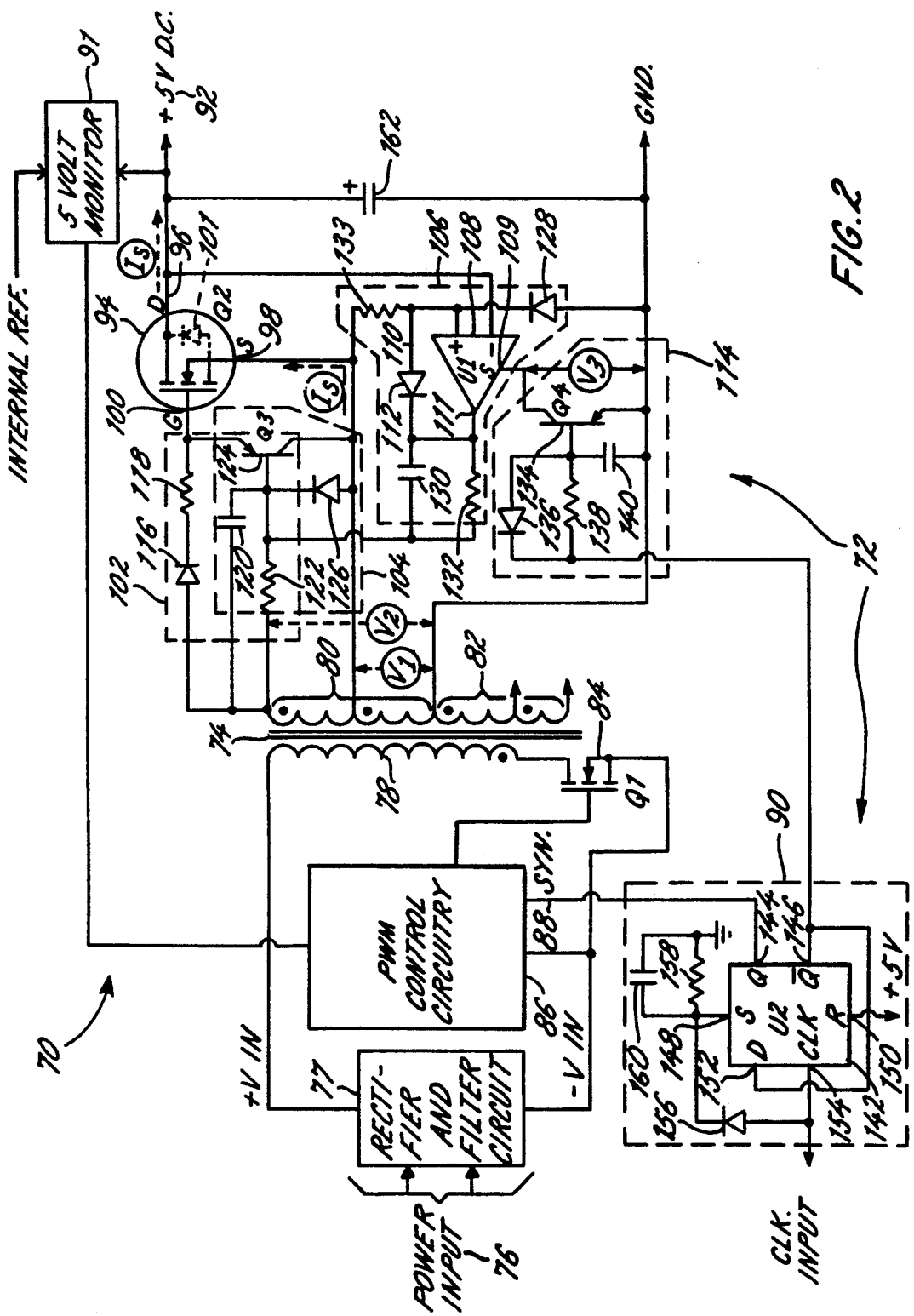
FIG. 2 is a schematic diagram of the enhanced synchronous rectifier used in the remote terminal power converter of the present invention.

Still referring to FIG. 1, in addition to supplying the predetermined low output voltage, the power converter 44 also receives sufficient voltage from the central office terminal 14 to power a remote terminal ringing generator 50. The remote terminal ringing generator 50 receives a signal from 2B1Q circuit 40 and supplies a selected ringing signal through a line 52 to 10 the POTS lines 54 in order to selectively ring one or both of the telephones 20. The remote terminal 18 also includes switching devices 56 and 58 which control whether a ringing signal will be applied to either of the telephones 20, depending on the digital signal received from the central office. 15 Turning now to the preferred embodiment of the present invention, FIG. 2 shows a schematic diagram of the enhanced synchronous rectifier used in the remote terminal power converter according to the present invention. FIG. 2 shows a remote terminal power converter 70, which corresponds to remote terminal power converter 44 in FIG. The remote terminal power converter 70 is capable of receiving a DC voltage variable between at least two substantially different levels from the central office terminal 14. The DC voltage from the central office terminal 14 includes one level for an idle condition, and a higher level when either or both of customer telephones 20 are busy or ringing. For example, depending on changes in power demands at the remote terminal, and when considering the high loop impedance of POTS quality lines, the central office must provide voltage levels from about −78 V to as high 260 V (+130 V to −130 V). Accordingly, the remote terminal power converter 70 must be capable of receiving the widely variable high level DC voltage from the central office terminal, and deriving remote terminal output voltages including a talk battery supply, a high voltage for a ringing generator, and a predetermined low voltage regulated supply. In order to function properly in this type of environment, the preferred embodiment of the present invention utilizes a discontinuous flyback converter design.

As shown in FIG. 2, the remote terminal power converter 70 includes an enhanced synchronous rectifier 72 in order to provide the low voltage regulated supply, which corresponds to synchronous rectifier circuit 46 in FIG. 1. Referring to FIG. 1, power from the adjustable DC line feed 32 is fed through transformer 33, POTS lines 22, interface transformer 42, and into remote terminal power converter 44. Referring back to FIG. 2, this power input is designated as power input 76. The input power 76 is rectified and the noise from the on-off switching of a switching transistor 84 is filtered out by a rectifier and filter circuit 77, which is connected to a transformer 74. The transformer 74 has a primary winding 78, and at least two secondary windings, including a low voltage secondary output winding 80 and a talk battery output winding 82.

The switching transistor 84 (a power field effect transistor in the preferred embodiment), which is also designated as Q1, is connected to transformer 74. The switching transistor 84 controls the time period in which the transformer 74 charges from the power input 76, and discharges through the circuitry of the synchronous rectifier 72 in order to produce the desired output voltages. In other words, the switching transistor 84 controls the time intervals of an output signal produced on the low voltage secondary output winding 80. This output signal has sequential charging, flyback, and discontinuous intervals, and is shown in FIG. 3 as waveform E and also designated as V1 and V2. The charging interval is the time period in which stored energy from the input rectifier and filter circuit 77 is stored in the core of transformer 74. The flyback interval is the time period in which the stored energy of transformer 74 is transferred through the synchronous rectifier 72 and filtered by an output capacitor 162 in order to produce the predetermined low voltage output supply. The discontinuous interval has a variable time duration dependent on the voltage level being coupled to the remote terminal power converter from the central office and the power demanded by the output loads from the power converter 70. For example, when the voltage applied from the central office is at a higher level, the duty cycle of the converter cuts back to provide only the necessary output power, and the discontinuous interval therefore becomes longer. Similarly, when more output power is demanded by the output loads from the remote terminal power converter 70, the time periods of both the charging and flyback intervals increase, thereby reducing the time period of the discontinuous interval. At the onset of the discontinuous interval, the reversal of current flow occurs in synchronous rectifier 72, and both the switching transistor 84 and a power switching device 94 are turned off, effectively disconnecting transformer 74, and allowing it to oscillate at its self-resonant frequency. In accordance with the present invention, the synchronous rectifier 72 provides a suitable output voltage to the low voltage loads by preventing the discontinuous interval from affecting that low output voltage. Thus, the synchronous rectifier 72 of the present invention is capable of turning off during the entire discontinuous interval, regardless of both the time duration of the discontinuous interval and the self-resonant voltage level of the transformer 74.

In order to regulate the low voltage supply at a predetermined level, shown as +5 V in the exemplary embodiment, it is necessary to regulate the time periods of the charging and flyback intervals. This function is performed by PWM (pulse width modulator) control circuitry 86 which sends a signal to the switching transistor 84 in order to turn transistor 84 on and off. The PWM control circuitry 86 is driven by a synchronous input signal 88 which is shown as waveform B in FIG. 3. The synchronous input signal 88 is supplied to the PWM control circuitry 86 from a synchronizing circuit 90 which comprises part of the enhanced synchronous rectifier 72 of the present invention, as explained in detail below. Additionally, a 5 Volt Monitor 91 is connected between the low voltage output and the PWM control circuitry 86.

Turning now to the operation of the enhanced synchronous rectifier 72 of the present invention, because the discontinuous interval can have a reasonably short time period to a relatively long time period, it is difficult to time the discontinuous interval. Instead, in practicing the invention, the synchronous rectifier 72 locks off during the discontinuous interval and is not reenabled until the discontinuous interval has indeed terminated. In the preferred practice, the synchronous rectifier 72 is coupled between the low voltage secondary output 80 of transformer 74 and a low voltage regulated supply 92, which is shown as +5 V in the preferred embodiment.

The enhanced synchronous rectifier 72 includes the power switching device 94 which is also designated as Q2. Power switching device 94 performs the rectifying function, and could comprise a power transistor, a FET, or in the preferred embodiment as shown in FIG. 2, power switching device 94 comprises a TMOS power FET. It should be noted that power switching device 94 is biased reverse to normal application. That is, a drain (D) 96 is more negative than a source (S) 98 when conducting current. Thus, whenever power switching device 94 is turned off, a gate (G) 100 is equal to or negative with respect to source 98, and the power switching device 94 performs like a conventional diode due to an internal parasitic diode 101 connected between drain 96 and source 98. In other words, the power switching device 94 conducts current pulses between the low voltage secondary output 80 and the low voltage regulated supply 92 during power-up of the remote terminal power converter 70, in order to provide a non-synchronous start-up mode for the power converter 70.

It should be noted that the use of power switching device 94 is an important feature of the present invention because it significantly reduces the voltage drop associated with conventional diode rectifiers, which are typically used to perform the rectifying function. Whenever the power switching device 94 is turned on, the 0.8 V diode drop, typically associated with rectifying diodes, is reduced to about 0.3 V for a 1 A current pulse. Thus, when providing the regulated low voltage output supply, the efficiency of the remote terminal power converter 70 is significantly increased.

In keeping with the present invention, the enhanced synchronous rectifier 72 includes drive circuitry connected to the power switching device 94 to turn on the power switching device 94 only during the flyback interval. As shown in FIG. 2, the drive circuitry of synchronous rectifier 72 includes "power on" circuitry 102 and "power off" circuitry 104. Circuitry 102 and 104 operate to turn on power switching device 94 at the termination of the charging interval so that the power switching device 94 is conducting during the entire flyback interval. The "power on" circuitry 102 includes a diode 116 and a resistor 118 connected to the secondary winding 80 in order to provide rapid switch-on of the power switching device 94 to capture a current pulse in the low voltage secondary output resulting from the transition between the charging interval and the flyback interval. "Power on" circuitry 102 also includes a capacitor 120, a resistor 122, and a transistor 124 also designated as Q3. Additionally, the "power off" circuitry 104 includes the capacitor 120, the resistor 122, and the transistor 124, and also includes a diode 126.

The enhanced synchronous rectifier 72 of the present invention also includes current sensing circuitry 106 which is capable of sensing the reversal of current flow in synchronous rectifier 72 which is indicative of the onset of the discontinuous interval. Current sensing circuitry 106 is also operable for turning off the power switching device 94 for at least the duration of the discontinuous interval, independent of the time duration of the discontinuous interval. Current sensing circuitry 106 includes a positive feedback loop 110 having a diode 112 which locks an output 111 of a comparator 108 in order to deactivate the power switching device 94 for at least the duration of the discontinuous interval. The comparator 108 also has a strobe input 109. Current sensing circuitry 106 also includes a diode 128, a capacitor 130, and two resistors 132 and 133.

The synchronous rectifier 72 also includes enabling circuitry 114 for enabling and disabling the output of the current sensing circuitry 106. The enabling circuitry 114 is operable for disabling the current sensing circuitry 106 during the charging interval and enabling the current sensing circuitry 106 during the flyback interval so that the current sensing circuitry 106 can sense the reversal of current flow indicative of the onset of the discontinuous interval. The enabling circuitry 114 includes a transistor 134 also designated as Q4, a diode 136, a resistor 138, and a capacitor 140.

Finally, the synchronous rectifier 72 includes synchronizing circuitry 90 which is associated with the enabling circuitry 114. The synchronizing circuitry 90 regulates the time period in which the enabling circuitry 114 enables and disables the output of current sensing circuitry 106. Additionally, the synchronizing circuitry 90, as explained above, sends a synchronizing signal 88 to the PWM control circuitry 86 in order to control the time duration in which the switching transistor 84 is turned on and off. In order to provide these various synchronizing signals, the synchronizing circuitry 90 includes a flip flop 142 (also designated as U2) which has a Q output 144, and a $\overline{Q}$ output 146. The flip flop 142 also has a set (S) input 148, a reset (R) input 150, a D input 152 and a clock (CLK) input 154. Connected between clock input 154 and set input 148 is a diode 156, a resistor 158 and a capacitor 160. By utilizing the drive circuitry described above, the synchronous rectifier 72 is capable of efficiently delivering a predetermined low voltage supply in the environment of a discontinuous flyback converter.

In order to describe the specific operation of the enhanced synchronous rectifier 72 of the present invention, it is necessary to view FIG. 3 in conjunction with FIG. 2. FIG. 3 shows a set of waveforms which demonstrate the operation of the enhanced synchronous rectifier used in the remote terminal power converter of the present invention. These waveforms have been denoted with letters A–I. As stated above, the remote terminal power converter 70 comprises a discontinuous flyback converter design, which must operate in a free-run state until a clock signal synchronizes the converter to the associated digital circuitry. In this embodiment, the synchronous rectifier operation will be discussed for producing a positive output voltage, although the rectifier could be adapted to produce a negative output voltage. The enhanced synchronous rectifier 72 operates in two modes, a free-run mode and a synchronized mode, as explained immediately below.

FREE-RUN MODE OPERATION

During the free-run mode, Q2 power switching device 94 is held off, and therefore operates as a conventional diode due to the presence of parasitic diode 101 as explained above. During the free-run operation, the clock (CLK) signal is low, as shown in waveform A. Therefore, the PWM control circuitry 86 operates at its internally designed frequency. With the absence of a clock signal, the set input 148 of flip flop 142 is held low by diode 156, resistor 158, and capacitor 160 which are connected between the clock input 154 and the set input 148 of flip flop 142. With the set input 148 in a low state, $\overline{Q}$ output 146 is held at a low state as shown in waveform C of FIG. 3. As shown in FIG. 2, $\overline{Q}$ output 146 is connected to enabling circuitry 114. Thus, with $\overline{Q}$ output 146 in a low state, Q4 transistor 134 is held off, as shown in waveform H. When Q4 transistor 134 is turned off, the strobe input 109 of comparator 108 is in a high state so that output 111 of comparator 108 is pulled to ground. This is due to the positive feedback loop 110 including diode 112 connected between output 111 and the positive input of comparator 108. With output of comparator 108 held to ground, Q3 transistor 124, which is connected to output 111 of comparator 108 through resistor 132, is biased on. Finally, when Q3 transistor 124 is turned on, gate 100 of Q2 power switching device 94 is held low, and therefore Q2 power switching device 94 is turned off.

As stated above, when Q2 power switching device 94 is turned off, it performs like a conventional diode. In other words, Q2 power switching device 94 conducts current pulses between the low voltage secondary output 80 and the low voltage regulated supply during power-up of the remote terminal power converter 70, in order to provide a non-synchronous start-up mode for the power converter 70. Waveform D shows the output of Q1 transistor 84 which is controlled by the internally designed frequency of the PWM control circuitry 86. Thus, because Q2 power switching device 94 acts as a conventional diode due to the parasitic diode 102, a capacitor 162 connected across the low voltage output 92 is charged until it reaches a high enough output level (+5 V in the exemplary embodiment) in order to provide power to the logic circuits in the remote terminal 18 of FIG. 1. When the logic circuits are powered, a clock signal is sent from 2B1Q circuit 40 to the clock input 154 of flip flop 142, and the synchronized mode begins.

SYNCHRONIZED MODE OPERATION

The synchronized mode operation occurs when a clock signal is provided to the remote terminal power converter 70. As shown in waveform A, the clock signal is continuously running during the synchronized mode. Waveform E shows the output signal from the low voltage secondary output 80 of transformer 74, which is designated as V1 and V2. This output signal provides the voltage for producing the predetermined low voltage regulated supply. As explained above, waveform E has three sequential intervals, designated as charging interval 170, flyback interval 172, and discontinuous interval 174. During the synchronized mode, the objective achieved by the synchronous rectifier of the present invention is to turn on Q2 power switching device 94 during the flyback interval, and turn off Q2 power switching device 94 for the duration of the discontinuous and charging intervals. This operation is achieved with the drive circuitry shown in FIG. 2, which operates in six stages described below. Again, the operation of the synchronous rectifier will be explained when viewing FIG. 2 in connection with FIG. 3.

STAGE 1: The clock input of waveform A drives the Q output 144 of U2 flip flop 142 low, and the $\overline{Q}$ output 146 goes high which starts the synchronized cycle. This stage of operation is shown on waveforms B and C as stage 1, which is also designated as 176. The PWM control circuitry 86 has an inherent delay before stage 2 starts, and resistor 138 and capacitor 140 of enabling circuitry 114 provides even more delay before stage 3 starts.

STAGE 2: Stage 2 is shown on waveforms D and E and is designated as 178. After the short time delay due to the PWM control circuitry 86, Q1 switching transistor 84 is turned on as shown in waveform D. Energy then begins to flow into the primary winding 78 of transformer 74, and the low voltage secondary output signals V1 and V2 both drop to negative voltage levels. As shown in waveform E, the negative value of V2 is greater than the negative value of V1, which causes resistor 122 to bias Q3 transistor 124 on, therefore holding Q2 power switching device 94 off. Thus, as can be seen in waveform F, Q2 power switching device 94 is turned off for the entire duration of the charging interval. Referring to FIG. 2, diode 126 conducts current which prevents a base-collector breakdown of Q3 transistor 124. During stage 2, no power flows from the secondary windings 80 and 82 of transformer 74. Additionally, as explained in the description of Stage 6, output 111 of U1 comparator 108 is locked at ground.

STAGE 3: After a short delay due to resistor 138 and capacitor 140, Q4 transistor 134 turns on, which pulls the strobe input 109 of U1 comparator 108 low thereby disabling U1 comparator 108. This forces the output 11 of U1 comparator 108 into an open state, as shown in waveform I. Stage 3, shown on waveforms H and I and designated as 180, occurs during the charging interval. Q2 power switching device 94 is still held off because V2 has a greater negative value than V1 whenever Q1 switching transistor 84 is turned on.

STAGE 4: Stage 4 is shown on waveforms D, E, F, and G and is designated also as 182. Q1 switching transistor 84 turns off as shown in waveform D, which is the start of the flyback interval. At the initiation of the flyback interval, current ($I_s$) is fed from low voltage secondary output 80 to the output capacitors, including capacitor 162, and the respective loads. The output 111 of U1 comparator 108 is still disabled (in an open state) since Q4 transistor 134 is turned on. As shown in waveform E, voltages V1 and V2 rise to a positive voltage level, with V2 having a greater value than V1. The level of voltages V1 and V2 through capacitor 120 and resistor 122 turn Q3 transistor 124 off, thereby allowing Q2 power switching device 94 to be turned on. Additionally, the bias through diode 116 and resistor 118 of the "power on" circuitry 102 provide rapid switch-on of Q2 power switching device 94 to capture a current pulse in the low voltage secondary output resulting from the transition between the charging interval and the flyback interval.

It should be noted that an important feature of the "power on" circuitry 102 is that it allows the current $I_s$, as shown in waveform G, to immediately rise to its highest level when Q2 power switching device 94 is turned on, which occurs at the initiation of the flyback interval. As explained immediately above, the diode 116 and resistor 118 of the "power on" circuitry 102 connected to the secondary winding 80 provide rapid switch-on of the power switching device 94. Additionally, when Q2 power switching device 94 is turned on, the forward voltage drop of Q2 is reduced significantly over conventional diode rectifiers, and in this example, the voltage drop is only about 0.25–0.3 V. Because of this reduction in voltage drop, the efficiency of remote terminal power converter 70 is significantly increased.

STAGE 5: Stage 5 is shown on waveforms C and H and also designated as 184. When the $\overline{Q}$ output 146 of U2 flip flop 142 goes low, Q4 transistor 134 turns off. Thus, the strobe input 109 of U1 comparator 108 goes high, so that U1 comparator 108 is no longer disabled. Thus, the current sensing circuitry 106 is enabled during the flyback interval, under the control of the output signals from synchronizing circuitry 90. This allows the current sensing circuitry 106 to sense the reversal of current flow in the synchronous rectifier at the onset of the discontinuous interval, and accordingly turn Q2 power switching transistor 94 off.

In connection with the operation of the current sensing circuitry 106, U1 comparator 108 can sink current to ground, but not source current. Therefore, a high output on U1 comparator 108 is an open circuit condition. Current $I_s$ flows from the low voltage secondary output 80 to the output loads as long as the level of V1 is greater than the level of voltage 92. Thus, when current is flowing in the forward direction, U1 comparator 108 remains in a high (open circuit) condition. Additionally, Q2 power switching device 94 remains on for the entire duration of the flyback interval.

STAGE 6: Stage 6 is shown on waveforms E, F, and G and is also designated as 186. At a point when the voltage V1 becomes negative with respect to the output voltage 92, the current $I_s$ starts to flow in the reverse direction, which indicates the onset of the discontinuous interval. This polarity change in current flow is detected by U1 comparator 108 which then pulls the output 111 to ground. When output 111 is at ground, Q3 transistor 124 is biased on thereby turning Q2 power switching device 94 off. When U1 comparator 108 pulls to ground, diode 112 conducts in the positive feedback loop 110 thereby pulling the positive input of U1 comparator 108 to ground and locking the output 111 at ground. This action ensures that Q2 power switching device 94 does not conduct during the oscillations of the discontinuous interval. Thus, the operation of the current sensing circuitry 106 in combination with the "power off" circuitry 104 prevents reverse current flow in the synchronous rectifier during the discontinuous interval.

As stated above, the discontinuous interval has a variable time duration which is dependent on the power demanded from the output loads and the voltage level being coupled to the remote terminal power converter 70 from the central office terminal 14. However, the enhanced synchronous rectifier of the present invention operates so that Q2 power switching device 94 remains off during the entire discontinuous interval, regardless of its duration. Thus, the discontinuous interval does not affect the output voltage, and a predetermined low voltage regulated supply can be provided.

Again, the power converter including the enhanced synchronous rectifier of the present invention is not limited only to applications involving remote terminal power converters in telephone systems. To the contrary, the power converter of the present invention could be used in any application or environment in which it is desired to provide a predetermined regulated low voltage supply from a widely variable DC input voltage. Stated differently, the power converter including the enhanced synchronous rectifier of the present invention could be used in any application in which a discontinuous mode occurs, thereby requiring the use of a discontinuous flyback converter, and also requiring that the synchronous rectifier be turned off during the entire discontinuous mode independent of the time duration of the discontinuous mode.

As is evident from the foregoing description, the remote terminal power converter of the present invention is capable of accepting widely variable high input voltages from the central office and providing a predetermined low voltage regulated supply. The present invention also increases the efficiency of the remote terminal power converter by utilizing an enhanced synchronous rectifier in a discontinuous flyback converter which reduces the loss associated with conventional diode rectifiers. Finally, the present invention provides an enhanced synchronous rectifier capable of operating efficiently and properly with a discontinuous flyback converter.

I claim:

1. A power converter for deriving output load voltages including a low voltage regulated supply from a DC input voltage variable between at least two substantially different levels, the power converter comprising, in combination:
   means for receiving the DC input voltage and supplying a low voltage output for producing the low voltage regulated supply;
   switch means associated with the receiving means for producing an output signal on the lower voltage output, the switch means controlling time periods of a charging interval and a flyback interval of the output signal, the output signal also having a discontinuous interval having a variable time duration occurring between termination of the flyback interval and initiation of a subsequent charging interval; and
   a synchronous rectifier coupled between the low voltage output and the low voltage regulated supply for increasing the efficiency of the power converter, the synchronous rectifier including:
      a power switching device for performing rectification on the low voltage output;
      means responsive to the termination of the charging interval for driving the power switching device on during the flyback interval; and
      means for sensing a condition indicative of onset of the discontinuous interval and turning off the power switching device for at least a duration of the discontinuous interval independent of the variable timer duration of the discontinuous interval.

2. The power converter of claim 1 wherein the means for receiving comprises a transformer having a low voltage secondary output for producing the low voltage regulated supply.

3. The power converter of claim 2 wherein the transformer has a secondary winding connected to the power switching device for rapid switch-on of the power switching device to capture a current pulse in the low voltage secondary output resulting from the transition between the charging interval and the flyback interval.

4. The power converter of claim 3 wherein the means responsive to the termination of the charging interval includes a diode and a resistor connected between the secondary winding and the power switching device in order to provide the rapid switch-on of the power switching device.

5. The power converter of claim 1 wherein the variable time duration of the discontinuous interval is dependent on a level of the input voltage received by the power converter and power demanded by output loads from the power converter.

6. The power converter of claim 1 wherein the condition indicative of the onset of the discontinuous interval comprises a reversal of current flow in the synchronous rectifier.

7. The power converter of claim 1 wherein the sensing means includes a sensor for detecting current flowing through the power switching device.

8. The power converter of claim 1 wherein the sensing means includes feedback means for locking an output of the sensing means in order to turn off the power switching device for at least the duration of the discontinuous interval.

9. The power converter of claim 1 wherein the sensing means includes means for enabling the sensing means after the termination of the discontinuous interval.

10. The power converter of claim 9 wherein the enabling means disables the sensing means during at least the charging interval and enables the sensing means during the flyback interval so that the sensing means can sense the condition indicative of the onset of the discontinuous interval.

11. The power converter of claim 10 further comprising:
   synchronizing means associated with the enabling means for regulating the time period in which the enabling means disables and enables the sensing means.

12. The power converter of claim 11 wherein the power switching device comprises a power field effect transistor (FET) paralleled by an internal parasitic diode polarized to conduct current pulses between the low voltage output and the low voltage regulated supply during power-up of the power converter, thereby to provide a non-synchronous start-up mode for the power converter.

13. The power converter of claim 12 wherein the transistor comprises a power FET having a source, a drain, and a gate, the power FET having the internal parasitic diode connected between the source and the drain so that the power FET operates as a conventional diode when it is turned off.

14. In a telephone system having a central office connected to a plurality of telephone loops, the central office powering each loop with a DC voltage variable between at least two substantially different levels, the system including a remote terminal connected to the loop, a power converter for the remote terminal for deriving remote terminal output voltages including a low voltage regulated supply from the DC voltage provided to the loop from the central office, the remote terminal power converter comprising, in combination:

means connected to the loop for receiving the DC voltage from the central office and supplying a low voltage output for producing the low voltage regulated supply;

switch means associated with the receiving means for producing an output signal on the low voltage output, the output signal having sequential charging, flyback, and discontinuous intervals, the discontinuous interval having a variable time duration depending on at least the voltage level being coupled to the loop by the central office; and a synchronous rectifier coupled between the low voltage output and the low voltage regulated supply for preventing the discontinuous interval from affecting the low voltage regulated supply, the synchronous rectifier including:

a power switching device for performing rectification on the low voltage output;

means responsive to termination of the charging interval for driving the power switching device on during the flyback interval; and means for sensing a condition indicative of onset of the discontinuous interval and turning off the power switching device for at least a duration of the discontinuous interval independent of the variable time duration of the discontinuous interval.

15. The power converter of claim 14 wherein the means for receiving comprises a transformer having a low voltage secondary output for producing the lower voltage regulated supply.

16. The power converter of claim 15 wherein the transformer has a secondary winding connected to the power switching device for rapid switch-on of the power switching device to capture a current pulse in the low voltage secondary output resulting from a transition between the charging interval and the flyback interval.

17. The power converter of claim 16 wherein the means responsive to the termination of the charging interval includes a diode and a resistor connected between the secondary winding and the power switching device in order to provide the rapid switch-on of the power switching device.

18. The power converter of claim 14 wherein the condition indicative of the onset of the discontinuous interval comprises a reversal of current flow in the synchronous rectifier.

19. The power converter of claim 14 wherein the sensing means includes a sensor for detecting current flowing through the power switching device.

20. The power converter of claim 14 wherein the sensing means includes feedback means for locking an output of the sensing means in order to turn off the power switching device for at least the duration of the discontinuous interval.

21. The power converter of claim 14 wherein the sensing means includes means for enabling the sensing means after the termination of the discontinuous interval.

22. The power converter of claim 21 wherein the enabling means disables the sensing means during at least the charging interval and enables the sensing means during the flyback interval so that the sensing means can sense the condition indicative of the onset of the discontinuous interval.

23. The power converter of claim 22 further comprising: synchronizing means associated with the enabling means for regulating the time period in which the enabling means disables and enables the sensing means.

24. The power converter of claim 23 wherein the power switching device comprises a power field effect transistor (FET) paralleled by an internal parasitic diode polarized to conduct current pulses between the low voltage output and the low voltage regulated supply during power-up of the power converter, thereby to provide a non-synchronous start-up mode for the power converter.

25. The power converter of claim 24 wherein the transistor comprises a power FET having a source, a drain, and a gate, the power FET having the parasitic diode connected between the source and the drain so that the power FET operates as a conventional diode when it is turned off.

26. In a telephone system having a central office connected to a plurality of telephone loops, the central office powering each loop with a DC voltage variable between at least two substantially different levels, on level for an idle condition and another level capable of powering a remote terminal to supply talk battery and ringing signals to a plurality of customer telephones, the system including the remote terminal connected to the loop, a power converter for the remote terminal for deriving remote terminal output load voltages including the talk battery supply and a low voltage regulated supply from the DC voltage provided to the loop from the central office, the remote terminal power converter comprising, in combination:

means including a transformer connected to the loop for receiving the DC voltage from the central office and supplying a plurality of outputs including the talk battery supply, the transformer having a low voltage secondary output for producing the low voltage regulated supply;

switch means associated with the transformer for producing an output signal on the low voltage secondary output, the output signal having sequential charging, flyback, and discontinuous intervals, the discontinuous interval having a variable time duration dependent on the voltage level being coupled to the loop by the central office and power demanded from output loads;

means connected to the switch means to set the charging and flyback intervals in order to regulate the low voltage supply at a predetermined level; and a synchronous rectifier coupled between the low voltage secondary output and the low voltage regulated supply for preventing the discontinuous interval from affecting the low voltage regulated supply, the synchronous rectifier including:

a power switching device for performing rectification on the low voltage secondary output;

means responsive to termination of the charging interval for driving the power switching device on during the flyback interval;

means for sensing a reversal of current flow in the synchronous rectifier and turning off the power switching device for at least a duration of the discontinuous interval independent of the variable time duration of the discontinuous interval;

means responsive to an output of the sensing means for locking the output of the sensing means in order to turn off the power switching device for at least the duration of the discontinuous interval; and means for enabling the output of the sensing means after termination of the discontinuous interval.

27. The power converter of claim 26 wherein the transformer has a secondary winding connected to the power switching device for rapid switch-on of the power switching device to capture a current pulse in the low voltage secondary output resulting from a transition between the charging interval and the flyback interval.

28. The power converter of claim 27 wherein the means responsive to the termination of the charging interval includes a diode and a resistor connected between the secondary winding and the power switching device in order to provide the rapid switch-on of the power switching device.

29. The power converter of claim 26 wherein the means connected to the switch means comprises a pulse width modulator control circuit.

30. The power converter of claim 26 wherein the means for locking comprises feedback means for locking the output of the sensing means.

31. The power converter of claim 26 wherein the enabling means is operable for disabling the sensing means during at least the charging interval and enabling the sensing means during the flyback interval so that the sensing means can detect the reversal of current flow in the synchronous rectifier at onset of the discontinuous interval.

32. The power converter of claim 31 further comprising:

synchronizing means associated with the enabling means for regulating the time period in which the enabling means disables and enables the output of the sensing means.

33. The power converter of claim 32 wherein the synchronizing means provides a synchronizing signal to the means connected to the switch means in order to set the flyback and charging intervals.

34. The power converter of claim 32 wherein the power switching device comprises a power field effect transistor (FET) paralleled by an internal parasitic diode polarized to conduct current pulses between the low voltage output and the low voltage regulated supply during power-up of the power converter, thereby to provide a non-synchronous start-up mode for the power converter.

35. The power converter of claim 34 wherein the transistor comprises a power FET having a source, a drain, and a gate, the power FET having the internal parasitic diode connected between the source and the drain so that the power FET operates as a conventional diode when it is turned off.

36. A method for providing a low voltage regulated output from a power converter located in a remote terminal of a telephone system, the telephone system having a central office which powers a plurality of telephone loops in the system with a DC voltage variable between at least two substantially different levels, one level for an idle condition and another level capable of powering output loads including a plurality of customer telephones, the power converter providing a low voltage regulated supply from the DC voltage provided by the central office, the method comprising:

receiving the variable DC voltage from the central office through a magnetic element in the power converter;

switching the DC voltage through the magnetic element to produce a low voltage signal having sequential charging, flyback, discontinuous intervals and the discontinuous interval having a variable time duration;

providing a synchronous rectifier in the power converter for increasing the efficiency of the power converter, the synchronous rectifier receiving the low voltage signal from the magnetic switching the synchronous rectifier on at the termination of the charging interval to couple current pulses from the low voltage signal to the low voltage regulated supply during the flyback interval; and sensing a condition indicative of the onset of the discontinuous interval, and turning off the synchronous rectifier for the entire discontinuous interval independent of the variable time duration of the discontinuous interval.

37. The method of claim 36 further comprising:

enabling synchronous rectifier after the termination of the discontinuous interval in preparation for sensing said condition associated with the onset of a subsequent discontinuous interval.

38. The method of claim 36 wherein the discontinuous interval has a variable time duration dependent on the voltage level being coupled from the central office to the remote terminal and power demanded by the output loads from the power converter.

39. The method of claim 36 wherein the sensing comprises sensing a reversal of current flow in the synchronous rectifier indicative of the onset of the discontinuous interval.

40. The method of claim 36 further comprising:

disabling the synchronous rectifier during a start-up mode and conducting non-synchronous current pulses from the magnetic element to produce a low voltage output for start-up of the power converter.

* * * * *